United States Patent
Lion

(10) Patent No.: US 8,469,235 B2
(45) Date of Patent: Jun. 25, 2013

(54) WHIPPED-CREAM DISPENSER TYPE COOKING APPARATUS WITH STORAGE HOLDER

(75) Inventor: Mathieu Lion, Paris (FR)

(73) Assignee: Mastrad SA (FR)

( * ) Notice: Subject to any disclaimer, the term of this patent is extended or adjusted under 35 U.S.C. 154(b) by 249 days.

(21) Appl. No.: 12/866,257

(22) PCT Filed: Feb. 3, 2009

(86) PCT No.: PCT/FR2009/000121
§ 371 (c)(1),
(2), (4) Date: Nov. 10, 2010

(87) PCT Pub. No.: WO2009/112706
PCT Pub. Date: Sep. 17, 2009

(65) Prior Publication Data
US 2011/0056988 A1    Mar. 10, 2011

(30) Foreign Application Priority Data
Feb. 7, 2008   (FR) ...................... 08/00652

(51) Int. Cl.
*B67D 7/84*       (2010.01)
(52) U.S. Cl.
USPC ........... 222/173; 222/129; 222/131; 222/325; 222/399
(58) Field of Classification Search
USPC ................ 222/399, 396, 129, 130–132, 173, 222/325; 248/105, 309.1
See application file for complete search history.

(56) References Cited

U.S. PATENT DOCUMENTS

| | | | | |
|---|---|---|---|---|
| 2,255,280 | A * | 9/1941 | Donald | 312/322 |
| 2,620,107 | A * | 12/1952 | Tolan | 62/166 |
| 2,732,977 | A * | 1/1956 | Charpiat | 222/131 |
| 3,147,889 | A * | 9/1964 | Dolgin | 222/131 |
| 3,180,529 | A * | 4/1965 | Buffington | 222/131 |
| 3,200,994 | A * | 8/1965 | Levinson et al. | 222/82 |

(Continued)

FOREIGN PATENT DOCUMENTS

| | | |
|---|---|---|
| CH | 370372 | 7/1963 |
| EP | 0163007 A1 | 12/1985 |

(Continued)

OTHER PUBLICATIONS

The above references U.S. # 2 and Foreign #s 1-2 and 4-6 were cited in a Search Report issued on Jul. 23, 2001 concerning the corresponding International Search Report in PCT/FR009/000121.

*Primary Examiner* — Frederick C Nicolas
(74) *Attorney, Agent, or Firm* — Cowan, Liebowitz & Latman, P.C.; Mark Montague, Esq.

(57) ABSTRACT

The invention relates to a whipped-cream dispenser type cooking apparatus (400) includes multiple parts and in particular a fluid tank (320), a head (310), an endpiece (304), and at least one gas charger (302). The apparatus comprises a storage holder (100) with a base in which there are defined at least one concave housing (102) suitable for taking said endpiece, and said fluid tank, these two elements being open to the air, a stop (106) for positioning said head, also open to the air, and at least one cell (204) suitable for housing a gas charger. The storage holder of the invention allows said parts to be stored tidily in an aerobic environment unfavorable to the proliferation of bacteria.

11 Claims, 4 Drawing Sheets

U.S. PATENT DOCUMENTS

| | | | |
|---|---|---|---|
| 3,883,043 A * | 5/1975 | Lane | 222/82 |
| 4,669,639 A | 6/1987 | Klarenbach et al. | |
| 4,706,847 A * | 11/1987 | Sankey et al. | 222/1 |
| 4,844,300 A * | 7/1989 | Simons et al. | 222/108 |
| 5,031,799 A | 7/1991 | Owen | |
| 5,246,140 A * | 9/1993 | Thix et al. | 222/4 |

FOREIGN PATENT DOCUMENTS

| | | |
|---|---|---|
| EP | 0291788 A1 | 11/1988 |
| EP | 1428791 A1 | 6/2004 |
| FR | 2385962 | 10/1978 |
| GB | 1588302 | 4/1981 |

* cited by examiner

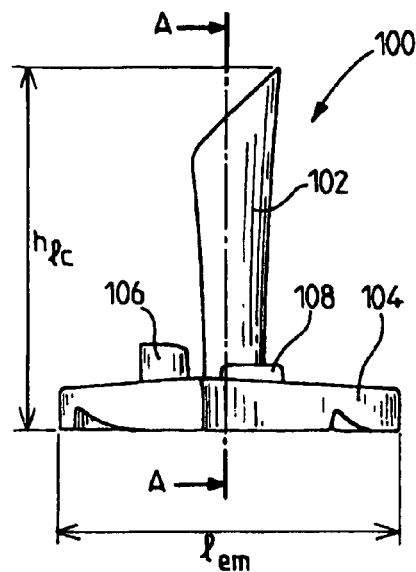
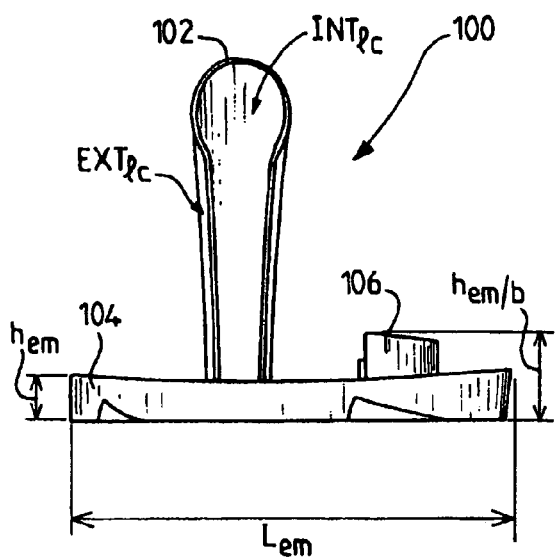
FIG.1  FIG.2
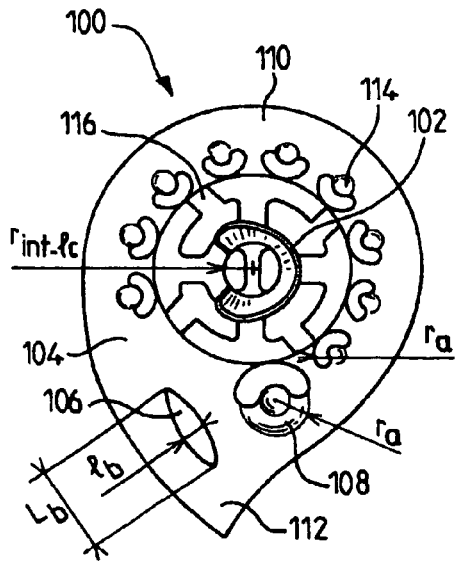
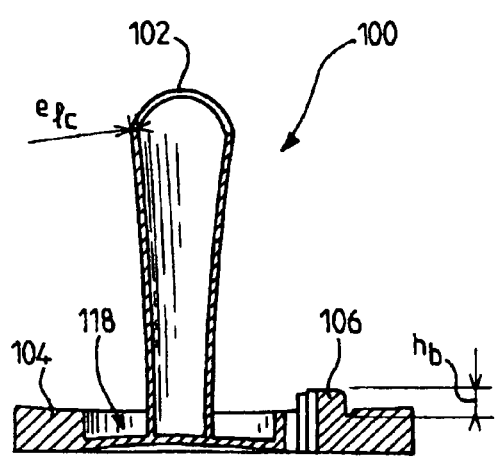
FIG.3  FIG.4

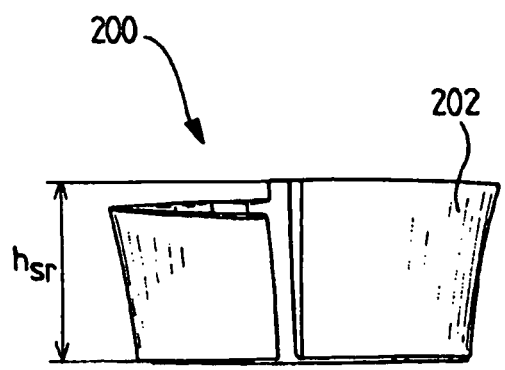
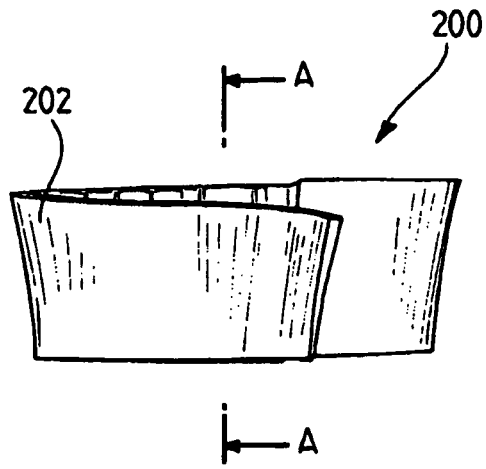
FIG. 5  FIG. 6
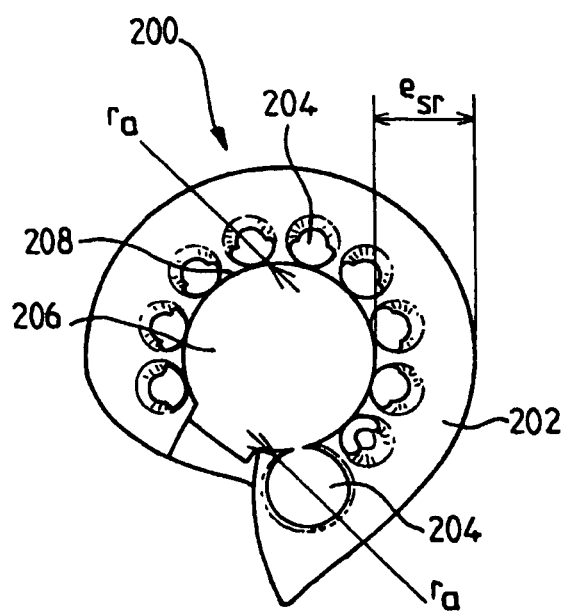
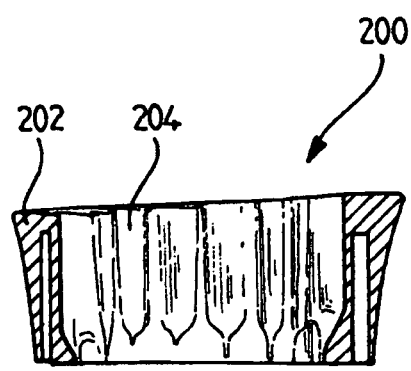
FIG. 7  FIG. 8

WHIPPED-CREAM DISPENSER TYPE COOKING APPARATUS WITH STORAGE HOLDER

CROSS-REFERENCE TO RELATED APPLICATIONS

This application is a National Stage Application of PCT Application No. PCT/FR2009/000121, filed on Feb. 2, 2009, which claims priority to French application Ser. No. 08/00652, filed on Feb. 7, 2008, the entire disclosure of each of which is incorporated herein by reference.

BACKGROUND OF THE INVENTION

The invention relates to cooking utensils and more precisely to a whipped-cream dispenser type cooking apparatus.

Cooking utensils are generally very diverse and variable in nature. Such utensils include dispensers. Dispensers are generally designed to create foam based on vegetables, on fruits, or from milk products. A dispenser can be adapted for hot preparations, for cold preparations, or for both. Cold preparations include especially whipped-cream preparations.

Dispensers are generally manufactured from stainless steel or aluminium with metal or synthetic parts which are resistant to washing up. Conventionally, a dispenser comprises at least one fluid tank, a head, an end-piece and one or more gas chargers. A dispenser comprises a system of aspiration through a tube allowing the contents to be removed easily from the fluid tank. Easy removal is ensured by an element of the push-button type, which can favourably be operated with one hand.

After use, a dispenser must be rinsed with copious amounts of water in order to remove all food residues. After washing, the dispenser must be rigorously dried before it can be stored in an appropriate place, such as a furniture item of the cupboard type.

All the washing/drying steps prior to storage are essential to avoid the proliferation of bacteria inside the dispenser.

BRIEF SUMMARY OF THE INVENTION

The invention is going to improve the situation.

To that end, the invention is going to introduce a whipped-cream dispenser type cooking apparatus comprising a fluid tank, a head, an end-piece and at least one gas charger. The apparatus according to the invention comprises a storage holder with a base in which there are defined:
- at least one concave housing designed to receive said end-piece and said fluid tank, in a situation of ventilation of these two elements,
- a stop for positioning said head, also in a situation of ventilation, and
- at least one cell suitable for housing a gas charger.

According to one embodiment, the base of the apparatus comprises on the one hand a support structure, on which said concave housing and said stop are located, and on the other hand a covering structure, on which the cell(s) is/are located. The support structure and the covering structure can be connectable to one another by suitable means.

According to another embodiment, the support structure has a substantially drop-shaped understructure with, on the one hand, a body on which there is positioned substantially centrally said concave housing and, on the other hand, an appendage on which said stop is defined. According to this embodiment, the covering structure has a substantially tapered shape designed to sit substantially on the periphery of said body so that, when the support structure and the covering structure are in the connected state, the two structures are arranged to form conjointly a peninsula zone described by at least part of said appendage.

The covering structure can be bevelled in the shape of a snail and can describe, by its inner periphery, a tapered housing designed to stabilise a fluid tank of a dispenser when the dispenser is received on the concave housing. The covering structure therefore forms a helical bevel on its upper plate. The concave housing can be a tubular pillar which receives on its inner side a dispenser end-piece and on its outer side said tank. Receiving is not necessarily effected by correspondence of shapes. The concave housing can further be designed to receive an element of the mop or brush type.

According to one embodiment, the base comprises a plurality of cells arranged in the manner of a revolver cylinder. The cells can then be defined on the covering structure and have the appearance of a spiral staircase. One cell can be designed to further house a capsule protector made of polypropylene.

According to one embodiment, the base is made of a material comprising antimicrobial agents of the type based on silver ions and is thus unfavourable to the proliferation of bacteria. According to another embodiment, the base can be made of a flexible material of the reinforced thermoplastic (RTP) type. Furthermore, the base can comprise through-holes to aid the situation of ventilation.

BRIEF DESCRIPTION OF THE DRAWINGS

Other advantages and features of the invention will become apparent upon reading the detailed description hereinbelow and from the accompanying drawings, in which:

FIG. 1 relates to the invention and shows a front view of a support structure,

FIG. 2 shows a side view of the support structure,

FIG. 3 shows a top view of the support structure,

FIG. 4 shows a transverse section of the support structure according to axis A-A in FIG. 1, FIG. 5 relates to the invention and shows a front view of a covering structure, FIG. 6 shows a side view of the covering structure, FIG. 7 shows a top view of the covering structure, FIG. 8 shows a transverse section of the covering structure according to axis A-A of FIG. 6.

DETAILED DESCRIPTION OF THE INVENTION

The drawings and the description hereinbelow essentially contain elements of a certain nature. The drawings show, at least in part, aspects which are difficult to describe other than by means of the drawings. They form an integral part of the description and may therefore not only serve better understanding of the invention but also contribute towards the definition thereof, where appropriate.

Figure 10:
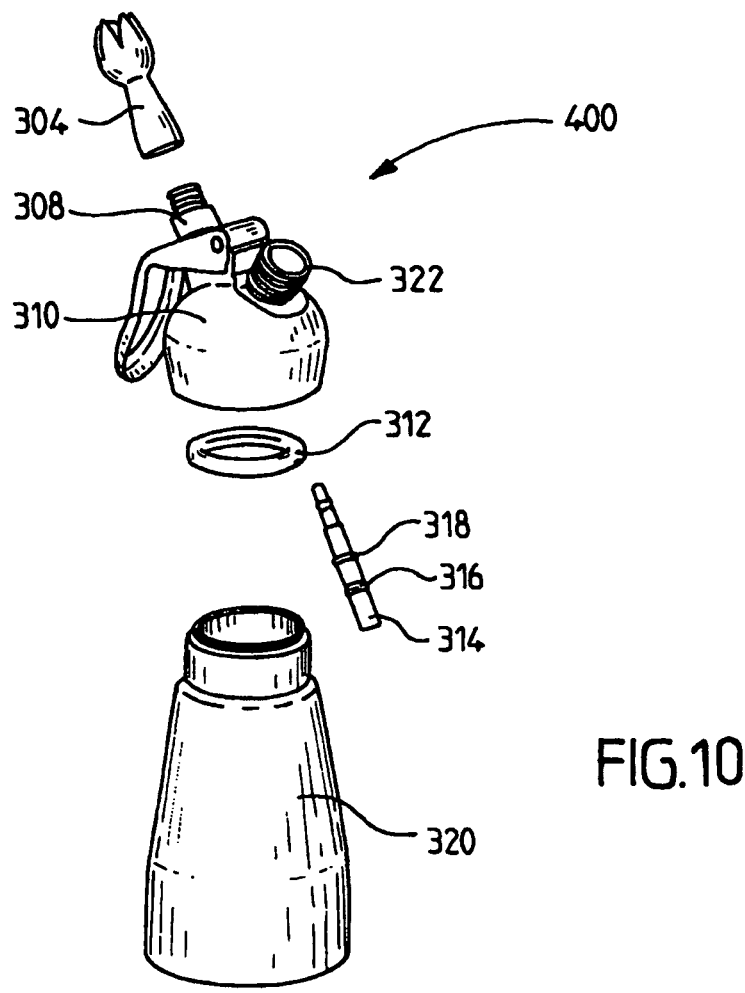
FIG. 10 shows an exploded perspective view of a dispenser.

Whipped-cream dispenser type cooking apparatuses will now be described in greater detail. A dispenser is an object composed of a plurality of parts. FIG. 10 shows an exploded perspective view of the parts which a dispenser 400 can comprise. There will firstly be seen a fluid tank 320, a head 310, an end-piece 304, a means of connecting said end-piece 304 to said head 310, especially an end-piece socket 308.

Figure 11:
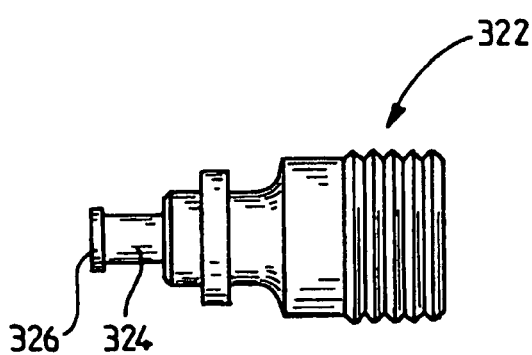
FIG. 11 shows a injection valve for a dispenser.

There will then be seen a seal 312, which is placed between the fluid tank 320 and the head 310, and a piston 314 with a bearing surface 316 and an O-ring 318. The head 310 is connected to an injection valve 322, which is shown in FIG. 11. The injection valve 322 comprises a flap 326 and a seal 324. The valve 322 is provided to be charged by gas chargers 302 for pressure regulation (chargers not shown in FIG. 11). Other elements can be added to these parts, such as capsule protectors, a mop or drainers.

The use of a dispenser requires the parts to be fitted together, and the parts will then be brought into contact with food products in order to create foam. Contact with the food product is the source of the proliferation of bacteria on the dispenser when it is not washed and dried correctly before being arranged/stored in a suitable place.

Conventionally, the dispenser, and more precisely the separate parts, are generally stored untidily in a box. In the box, the parts are in contact with one another. The areas of contact create surfaces which are in an anaerobic situation, which is the source of the proliferation of bacteria.

The cooking apparatus of the invention proposes a storage holder which allows all the parts of the dispenser to be grouped together in one place. The parts are then stored tidily. The storage holder is further designed to permit effective drying of all the parts of the dispenser after it has been used and washed. To that end, each part of the cooking apparatus of the invention is substantially stored in a situation of ventilation.

A situation of ventilation is understood as meaning that air circulates freely over at least part of the various parts or elements of the dispenser. The storage holder is advantageously provided with a plurality of through-holes which aid such circulation and accordingly create an aerobic-type environment for the apparatus. The aerobic-type environment permits conditions which do not favour the proliferation of bacteria.

The invention therefore has a double effect. On the one hand, the invention allows all the elements/parts of a dispenser to be grouped together in order to allow the apparatus to be stored tidily and thus prevent parts from being lost and, on the other hand, the invention allows the apparatus to be stored in a situation of ventilation by means of the storage holder.

FIG. 1 shows a support structure 100 according to an embodiment of the invention. The support structure 100 comprises a concave housing 102 made from a tubular pillar. In general, the concave housing 102 is substantially tapered with an inside radius $r_{int-lc}$ of approximately 5 mm at its lower end and of approximately 15 mm at its upper end. The height $h_{lc}$ of the concave housing 102 is approximately from 100 mm to 150 mm. According to the embodiment of FIG. 1, the concave housing 102 is bevelled at its upper end.

FIG. 2 shows a side view of the support structure 100, in which there can be seen an inner side $INT_{lc}$ and an outer side $EXT_{lc}$ of the concave housing 102.

FIG. 4 shows a transverse section of the support structure 100 according to axis A-A. According to the described embodiment, the concave housing 102 is formed by a wall having a thickness $e_{lc}$ of approximately from 1 mm to 3 mm.

In general, the concave housing 102 is shaped to ensure that the parts that it receives are well ventilated.

FIG. 1 shows an understructure 104 at the lower end of the support structure 100. The understructure 104 is substantially drop-shaped, as is shown in FIG. 3 in a top view of the support structure 100.

The drop is formed by a body 110 and an appendage 112. The concave housing 102 is located substantially in the centre of the body 110.

FIG. 3 also shows, on the bottom of the support structure 100, through-holes 116 of various shapes, which together define a chosen pattern, which can be partly aesthetic while permitting good ventilation and holding of the parts, where necessary. In this respect, FIG. 3 constitutes the definition of an example of the shape which can be exhibited by said through-holes 116.

In FIG. 3 there can be seen a plurality of cut-outs or indentations 114, which are provided to receive and stabilise the chargers 302. According to the embodiment shown, the cut-outs have a radius $r_a$ which is substantially identical with the radii of the cells 204. However, the cut-outs or indentations 114 can be of various shapes, which together define a chosen pattern, which can be partly aesthetic while permitting good ventilation and holding of the parts, and especially the cells, where necessary. In this respect, FIG. 3 constitutes the definition of an example of the shape which can be exhibited by said cut-outs or indentations 114.

According to the described embodiment, the understructure 104 is described by a parallelepiped having a length $L_{em}$ of approximately from 150 mm to 160 mm, a width $l_{em}$ of approximately from 110 mm to 120 mm and a height $h_{em}$ of approximately from 10 mm to 20 mm. The body 110 has at least one circular portion having a radius $r_{em}$ of approximately from 55 mm to 60 mm. The understructure 104 can have a circular recess 118 centred on the body 110 and encircling the concave housing 102 at its lower end. The circular recess 118 is provided for receiving an edge of a fluid tank 320 of a dispenser 400 (described in detail hereinbelow).

In FIGS. 1 to 4, a stop 106 will be seen in the region of the appendage 112 of the understructure 104. According to the described embodiment, the stop 106 is substantially in the form of a sloping ovoid having a length $L_b$ of approximately from 25 mm to 35 mm, preferably 30 mm, having a width $l_b$ of approximately from 5 mm to 10 mm, preferably from 8 mm to 9 mm, and having a height $h_b$ of approximately from 12 mm to 16 mm. The stop 106 is provided for positioning a head 310 of a dispenser 400.

FIGS. 1 and 3 also show a centring means 108 which allows a covering structure 200 to be positioned on the support structure 100.

FIGS. 5 to 8 relate to the covering structure 200. The assembly comprising the support structure 100 and the covering structure 200 forms the base of the storage holder of the cooking apparatus of the invention.

The centring means 108 allows a connection between the support structure 100 and the covering structure 200 to be adjusted. When the two structures are in the connected state, they are provided to form conjointly a peninsula zone described by at least part of the appendage 112. FIGS. 5 to 7 show the covering structure 200, which has a substantially tapered shape and is designed substantially to sit on the peripheral edge of the body 110 of the understructure 104. The covering structure 200 is described at least partly by a cone having a height $h_{sr}$ of approximately from 50 mm to 70 mm and forms, at least partly, a ring having a thickness $e_{sr}$ chosen to include cells 204 having a radius $r_a$ of from 8 mm to 15 mm.

FIG. 7 shows the covering structure 200 in the form of a ring 202. The ring 202 comprises a plurality of cells 204 capable of housing gas chargers of the carbon dioxide ($CO_2$) charger type. According to one embodiment, the cells 204 can be arranged in the manner of a revolver cylinder. This arrangement in the manner of a revolver cylinder is shown on the one hand in FIG. 7, which shows a top view of the covering structure 200, and on the other hand in FIG. 8, which shows a transverse section of the same structure according to axis A-A of FIG. 6. The depth of the cells 204 is substantially chosen to receive gas chargers of the dispenser of the invention and is approximately from 60 mm to 65 mm.

According to one embodiment, and as shown in FIG. 7, one cell 204 is arranged further to accommodate a capsule protector.

The ring 202 of the covering structure 200 and according to the embodiment described here is bevelled in the shape of a snail and describes by its inner edge 208 a substantially tapered housing 206 designed to stabilise the fluid tank 320 when it is received by the concave housing 104 on the one hand and by the circular recess on the other hand. The concave housing 104 has a variable radius $r_{lc}$ of approximately from 30 mm to 45 mm. It will be noted that the housing 206 can have different shapes according to the appearance of the covering structure 200. Accordingly, the housing 206 can have a conical or rectangular shape, for example. However, the housing 206 is advantageously suitable for stabilising and receiving the fluid tank of a dispenser chosen for the cooking apparatus. It will be noted that the fluid tank is arranged head-to-tail on the base.

Figure 9:
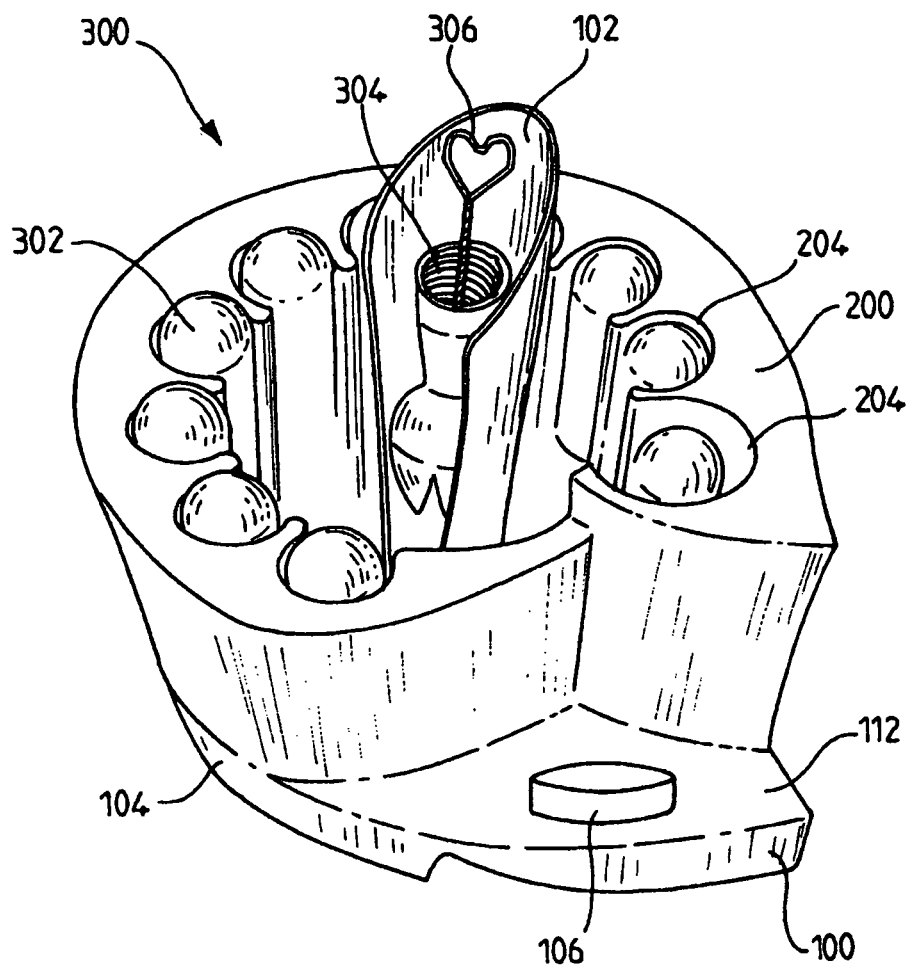
FIG. 9 shows a perspective view of the base comprising some parts of a dispenser.

FIG. 9 shows the support structure 100 and the covering structure 200 in the connected state, together forming a base 300. This figure shows chargers 302 when they are received in the cells 204 and stabilised by the cut-outs 114. An end-piece 304 and a brush 306 of a dispenser of the cooking apparatus of the invention are received in the concave housing 102. It will be noted that the centring means 108 (not shown in FIG. 9) also allows a means for fixing/indexing a capsule protector on the base 300 to be formed.

The support structure 100 and the covering structure 200 can be assembled in a reversible or irreversible manner to form the base 300. A reversible assembly allows the base 300 to be disassembled and accordingly facilitates cleaning of the support structure 100 and the covering structure 200. For an irreversible assembly, it is possible to use adhesive bonding or fused bonding methods to connect the support structure 100 to the covering structure 200. As mentioned above, the material of which the apparatus is made is composed according to one embodiment of a plastics material comprising a silver-based antimicrobial additive. The covering structure 200 is preferably made of a flexible plastics material of the reinforced thermoplastic (RTP) or silicone type. This permits a certain freedom of adaptation for receiving the different parts of a dispenser 400. The support structure 100 is preferably made of a rigid plastics material of the polyolefin type (especially polypropylene, polyethylene) for reasons of stability of the base 300.

The invention claimed is:

1. Whipped-cream dispenser type cooking apparatus comprising:
   a fluid tank,
   a head,
   an end-piece,
   at least one gas charger, and
   a storage holder with a base including:
      at least one concave housing designed to receive said end-piece and said fluid tank, in a situation of ventilation of said end piece or said fluid tank,
      a stop for positioning said head, also in a situation of ventilation, and
      at least one cell capable of housing the at least one a gas charger.

2. Apparatus according to claim 1, wherein the base comprises:
   a support structure on which said concave housing and said stop are located, and
   a covering structure on which the at least one cell is located, said support structure and said covering structure being connectable to one another.

3. Apparatus according to claim 2, wherein
   the support structure has a substantially drop-shaped understructure having on a one hand a body on which there is positioned, substantially centrally, said concave housing, and on another hand an appendage on which said stop is defined,
   the covering structure has a substantially tapered shape designed to sit substantially on a periphery of said body, and in that, when said support structure and said covering structure are in a connected state, said support structure and said covering structure are provided to form conjointly a peninsula zone, described by at least part of said appendage.

4. Apparatus according to claim 3, wherein the covering structure is bevelled in the shape of a snail and describes by the covering structure's inner periphery a tapered housing designed to stabilize said fluid tank when the covering structure is received on said concave housing.

5. Apparatus according to claim 1, wherein the concave housing is a tubular pillar which receives on the concave housing's inner side said end piece and on its outer side said tank.

6. Apparatus according to claim 1, wherein the base comprises a plurality of cells arranged in a manner of a revolver cylinder.

7. Apparatus according to claim 1, wherein one cell is designed to further house a capsule protector.

8. Apparatus according to claim 1, wherein the base is made of a material comprising antimicrobial agents of a type based on silver ions.

9. Apparatus according to claim 1, wherein the base is made of at least one material selected from the following group: materials of a reinforced thermoplastic (RTP) type, materials of a silicone type, and materials of a polyolefin type.

10. Apparatus according to claim 1, wherein the base has, substantially on a support structure, through-holes to aid said situation of ventilation.

11. Apparatus according to claim 1, wherein:
   an understructure is described by a parallelepiped having a length ($L_{em}$)) of approximately from 150 mm to 160 mm, a width ($l_{em}$) of approximately from 110 mm to 120 mm and a height ($h_{em}$) of approximately from 10 mm to 20 mm and has on said body at least one circular portion having a radius ($r_{em}$) of approximately from 55 mm to 60 mm,
   the concave housing is substantially tapered with a variable inside radius ($r_{int-lc}$) of approximately from 5 mm to 15 mm and a height ($h_{lc}$) of approximately from 100 mm to 150 mm and formed by a wall having a thickness ($e_{lc}$) of approximately from 1 mm to 3 mm,
   a covering structure is described at least partly by a cone having a height ($h_{sr}$) of approximately from 50 mm to 70 mm and forms at least partly a ring having a thickness ($e_{sr}$) selected to include at least one cell having a radius ($r_a$) of from 8 mm to 15 mm,
   a tapered housing has a variable radius ($r_{lc}$) of approximately from 30 mm to 45 mm, and
   said stop is substantially ovoid in shape having a length ($L_b$) of approximately 30 mm, a width ($l_b$) of approximately from 8 mm to 9 mm and a height ($h_b$) of approximately from 12 mm to 16 mm.

* * * * *